UNITED STATES PATENT OFFICE

MAURICE C. TAYLOR AND JAMES F. WHITE, OF NIAGARA FALLS, NEW YORK, ASSIGNORS TO THE MATHIESON ALKALI WORKS, INC., OF NEW YORK, N. Y., A CORPORATION OF VIRGINIA

MANUFACTURE OF WOOD PULP

No Drawing. Application filed April 17, 1930, Serial No. 445,197. Renewed May 19, 1932.

This invention relates to improvements in the pulping of wood chips. We have discovered that aqueous solutions containing the chlorite radical, such as aqueous solutions containing sodium chlorite and calcium chlorite, are peculiarly effective agents for effecting the conversion of wood chips into wood pulp or cellulose because they have the property of penetrating between the wood fibres enabling them effectively to operate to dissolve or otherwise remove those substances cementing the wood fibres together including lignins, resins and carbohydrates.

The application of chlorine and hypochlorites to the conversion of wood chips into wood pulp has hitherto been proposed but these proposals have not developed into satisfactory commercial processes. We believe this to have been due to a lack of this ability, just noted with respect to the chlorites, to penetrate between the fibres of the wood, at least as hitherto applied.

According to our invention, the wood chips are digested with an aqueous solution containing a chlorite, sodium chlorite or calcium chlorite for example. The noncellulose substances of the wood chips are dissolved or removed even at ordinary temperatures and with low concentration of the chlorite, but the operation is promoted by carrying out the digestion at elevated temperatures, and with concentrations of the chlorite approaching saturation of the treating solution. The digestion may be carried out at temperatures up to 100° C. or at higher temperatures under superatmospheric pressure and the treating solution may contain, for example, 125 grams per liter of calcium chlorite or its equivalent of sodium chlorite. The period of digestion required varies with different woods and with wood in different conditions; using the concentrations and temperatures just mentioned, the period of digestion may approximate 16 hours, for example.

The following example will illustrate one application of the invention: 100 parts of poplar chips are charged to a digester together with 15 parts of lime 62 parts of calcium chlorite and 500 parts of water. The chips are subjected to digestion in the resulting liquor at a temperature approximating 100° C. for a period of about 16 hours. The volume of the liquor is maintained by addition of water as necessary. Just before the chlorite content of the liquor is exhausted, 31 additional parts of calcium chlorite are added. At the end of the digestion period the pulp is drained and subjected to further disintegration in a ball mill.

The pulping action is promoted by agitation of the wood chips during digestion, by rapid circulation of the treating solution through the wood chips or by mechanical agitation, for example. The treating solution may be acid, neutral or alkaline, but it is usually advantageous to use neutral or alkaline treating solutions. In any case, the cellulose itself does not seem to be subjected to any destructive action. The wood chips subjected to digestion may be of usual size.

The consumption of chlorite in the pulping operation may be reduced, in the case of resinous woods such as pine and spruce, by appropriate pretreatment of the chips, for example, by treatment with steam or with solutions of ammonium hydroxide.

The pulp product is, by the treatment with the chlorite solution, bleached at the same time that it is pulped, and may be used directly, for example, in the manufacture of white paper. The pulp product may, however, be subjected to further bleaching treatment. Such further bleaching may, with advantage, be effected by treatment with dilute solutions of hydrochloric acid, solutions containing about 0.4 grams per liter of hydrochloric acid for example, or may be effected by treatment with solutions of sodium bisulfite.

Although the chlorites of the metals of the group comprising the alkali-metals or alkaline-earth-metals are particularly useful in carrying out our invention, the other salts of chlorous acid are also useful in carrying out our invention.

We claim:
1. In the pulping of wood chips, the improvement which comprises digesting the wood chips with an aqueous solution containing a chlorite of a metal of the group comprising the alkali-metals and the alkaline-earth-metals.

2. In the pulping of wood chips, the improvement which comprises digesting the wood chips with an aqueous solution containing a salt of chlorous acid.

3. In the pulping of wood chips, the improvement which comprises digesting the wood chips with an aqueous solution containing the chlorite radical.

In testimony whereof we affix our signatures.

MAURICE C. TAYLOR.
JAMES F. WHITE.